UNITED STATES PATENT OFFICE 2,546,659

EXPANSION JOINT SEALING FILLER

Paul Sussenbach, St. Louis, Mo., assignor to The Presstite Engineering Company, St. Louis, Mo., a corporation of Missouri No Drawing. Application August 14, 1948, Serial No. 44,410

13 Claims. (Cl. 260—28.5)

This invention relates to expansion joint sealing fillers and, more particularly, to fillers of this class particularly adapted for use in sealing expansion joints in concrete construction.

Among the several objects of the invention may be noted the provision of a filler composition particularly for sealing expansion joints in concrete pavement construction and the like which may be mixed and applied cold; the provision of an internally-setting filler of the class described having such a consistency when first mixed that it may be applied as by pumping into joints to be sealed and which sets up into a resilient and adhesive composition capable of sealing the joints throughout the range of temperatures to which the joints are subjected; the provision of a filler of this class which, when set, is resilient and adhesive even at low temperatures so that it will not crack or separate from the joint surfaces; the provision of a filler of this class which, when set, will not substantially slump or flow even when subjected to high temperatures; and the provision of a filler such as described adapted for application effectively to seal expansion joints in concrete construction even when the concrete is wet. Other objects will be in part apparent and in part pointed out hereinafter.

The invention accordingly comprises the ingredients and combinations of ingredients, the proportions thereof, and features of composition, which will be exemplified in the products hereinafter described, and the scope of the application of which will be indicated in the following claims.

This application is a continuation-in-part of my copending application entitled Asphaltic Cement, Serial No. 686,953, filed July 29, 1946 and now abandoned.

This invention has for its purpose the provision of a filler for sealing expansion joints in concrete construction which may be mixed and applied cold while meeting the requirements of specifications for a hot-poured filler such as defined in Federal specification SS-F-336a, dated May 19, 1947. Generally, such specifications require the filler to be a resilient and adhesive composition which is capable of effectively sealing joints in concrete against the infiltration of moisture throughout repeated cycles of expansion and contraction, and which will not flow from the joint or, where used in highway construction, be picked up by vehicle tires at summer temperatures. The filler in a joint must remain resilient and adhesive throughout the range of atmospheric temperatures to which it may be subjected. This invention provides a filler adapted to meet these requirements which may be mixed and applied cold and which sets internally after application to form a resilient, adhesive material that effectively seals unprimed joints in concrete with an extremely strong bond between the joint surfaces. The filler may be applied at any temperature, even during the winter at temperatures below freezing, and has the marked advantage that it may be applied while the concrete is still wet without any adverse affects upon its bond to the concrete.

The filler comprises a dry component and a liquid component which are mixed cold on the job to a consistency suitable for application to a joint by pumping or other methods. The dry component is in bulk form and comprises generally a mixture of a comminuted or pulverized hard asphalt, such as gilsonite, and fibrous material, such as asbestos fibres. The latter is provided to enhance the tensile strength of the ultimate filler. Other filler materials may be added. The liquid component generally comprises a mixture of an oil, a rubber (either natural or synthetic or a mixture of the two) and a steam refined asphalt. The oil used must be compatible with the hard asphalt ingredient of the dry mix, i. e., it must be capable of blending with the hard asphalt without separation or reaction to soften the hard asphalt, and also of such characteristics as to plasticize the rubber ingredient of the liquid mix. It must also be substantially non-volatile at temperatures below the highest temperature to which the filler may be subjected when in the joint to avoid drying, and have a low pour point to enable the filler to be mixed and applied at low temperatures.

Specific examples of suitable dry and liquid components are as follows:

*Dry mix component*

| Ingredient | Per cent by weight |
|---|---|
| Gilsonite | 48.7 |
| Asbestos Fibre | 17.8 |
| Asbestos Floats | 20.0 |
| Limestone Dust (Whiting) | 8.3 |
| Diatomaceous Earth | 5.2 |
| | 100.0 |

Asbestos floats are fine powder-like tailings from the processing of asbestos to obtain fibre.

Liquid mix component

| Ingredient | Per cent by weight |
| --- | --- |
| Mineral Oil | 67.3 |
| Steam Refined Asphalt | 30.3 |
| GR-S Rubber | 2.4 |
| | 100.0 |

GR-S rubber is a copolymer of butadiene and styrene.

With respect to the ingredients of the dry component, gilsonite is exemplary of a hard asphalt which may be pulverized and which has a melting point in excess of the highest temperature to which the filler may be subjected in the joint by reason of summer temperatures. It is contemplated that other hard asphalts capable of being pulverized and having such melting point, preferably above 250° F., may be used. The proportion of the hard asphalt ingredient of the dry component may range from 25% to 60% by weight. The asbestos fibre, or other similar fibrous material, is an essential ingredient and may range in proportion from 5% to 25%. Inclusion of asbestos floats is important for best results, although this ingredient may be omitted. The floats may range in proportion from 0% up to 30%. The asbestos floats, limestone dust and diatomaceous earth ingredients are simply filling materials and may be omitted, or other inert fillers may be substituted therefor. The limestone dust may range in proportion from 0% up to 20% and the diatomaceous earth from 0% up to 10%. The ingredients of the dry component are mixed together dry to disperse the hard asphalt particles throughout the other ingredients. It will be understood that the proportion of the hard asphalt is such as to provide a sufficient amount for such dispersal.

With respect to the ingredients of the liquid mix, the oil used is distinguished by its physical characteristics in respect to its compatability with the hard asphalt ingredient of the dry component and its ability to plasticize the rubber ingredient of the liquid component. The most desirable oils are mineral oils having a pour point below −20° F., an aniline point below 110° F., a Saybolt Universal viscosity @ 100° F. below 100, and a flash point (C. O. C.) above 300° F. I have found that commercial mineral oils such as are refined for use in lubricating refrigeration machinery, where the oil is subject to relatively low temperatures, are satisfactory. Mineral oils having a pour point below 0° F., an aniline point below 140° F., a Saybolt viscosity @ 100° F. below 300, and a flash point (C. O. C.) above 250° F. are acceptable. The aniline point of the oil is a measure of its compatability with the hard asphalt. The proportion of the oil ingredient of the liquid component may range from 42% to 79% by weight, as long as the amount of oil is sufficient to blend with the hard asphalt of the dry component.

The steam refined asphalt ingredient of the liquid component is a soft, ductile and adhesive material obtained by steam refining petroleum asphalt. It preferably should have a melting point (ball and ring) below 150° F., a penetration @ 77° F. (A. S. T. M.) of 20 cms. or above, and a ductility @ 77° F. (A. S. T. M.) of 60 cms. or above. It may range in proportion from 5% to 35%.

The rubber ingredient of the liquid component may range in proportion from 1% to 15%. GR-S rubber is preferred. Natural rubber may be used, or a mixture of GR-S rubber and natural rubber. It is contemplated that other elastomers which are miscible with the asphalt ingredients of the composition may be used. The elastomer ingredient of the mix has been found to improve the consistency of the filler after initial mixing of the dry and liquid components and before setting, and also markedly to improve the resistance of the filler to slump or flow to enable it to meet the non-flow requirements of the above-mentioned Federal specifications. The rubber is prepared for use in the liquid mix by milling it and dispersing it in the oil ingredient which acts as a plasticizer for the rubber.

The dry and liquid components are supplied in separate receptacles to the location where joints are to be poured, and mixed cold on the job in such proportions as to obtain a semi-liquid viscous consistency suitable for pumping into the joints. Suitable proportions for the specific dry and liquid components above described are 51 parts of dry material to 39 parts of liquid by weight (57% dry, 43% liquid). It will be understood that the proportion of dry component to liquid will vary in accordance with variations in the proportions of the respective ingredients of the components. The proportion of dry component to liquid may also be varied to vary the consistency of the set filler, a harder filler being obtained by using more of the dry component in proportion. The important factor in proportioning the dry and liquid components is to obtain a mix of the proper initial consistency for application to the joint.

The viscous mixture of the dry and liquid components is pumped or otherwise suitably applied in the open joint. It sets in the joint by internal action as the oil is taken up by the particles of hard asphalt, and forms a resilient and adhesive material strongly bonded to the joint surfaces, which remains resilient and adhesive throughout repeated cycles of joint expansion and contraction due to temperature changes. This is because the oil ingredient of the composition is substantially non-volatile even at the highest summer temperatures to which the composition is subjected in the joint, and the set filler accordingly does not dry out and harden. Furthermore, the set filler will not flow out of the joint even at high temperatures. Thus, it is highly suitable for use in inclined joints, as, for example, joints in superelevated highway curves. The filler may be effectively mixed and applied even at low winter temperatures, for example 0° F., since the oil ingredient has a low pour point and will still flow at such temperatures. A remarkable property of the filler of this invention is its adaptability for application to joints in concrete construction even while the concrete is still wet, without any adverse effect upon its bond to the joint surfaces. This enables the joints to be sealed shortly after the concrete has been poured, after it has attained its initial set for example, and thus enables a joint-sealing job to be completed quickly without waiting for the concrete to dry.

In view of the above, it will be seen that the several objects of the invention are achieved and other advantageous results attained.

As many changes could be made in the above products without departing from the scope of the invention, it is intended that all matter contained in the above description shall be interpreted as illustrative and not in a limiting sense.

I claim:

1. An internal-setting asphaltic filler adapted for cold application to seal expansion joints, comprising a mixture of a dry component comprising comminuted hard asphalt dispersed throughout fibrous material, and a liquid component comprising a soft, ductile and adhesive asphalt, a rubber which is miscible with the hard asphalt, and an oil which is compatible with the hard asphalt and which is adapted to plasticize the rubber ingredient, said oil being substantially non-volatile at temperatures below the highest summer temperature to which it may be subjected in a joint and which will pour at winter temperatures, and being in amount sufficient to blend with the hard asphalt of the dry component, said dry and liquid components being mixed in such proportions that the initial mixture even when cold has a readily workable semi-liquid consistency suitable for application to a joint and which sets internally to form a resilient and adhesive joint-sealing material.

2. An internal asphaltic filler adapted for cold application to seal expansion joints, comprising a mixture of a dry component comprising a comminuted hard asphalt having a melting point above 250° F. dispersed throughout fibrous material, and a liquid component comprising steam refined petroleum asphalt, a rubber which is miscible with the hard asphalt, and a mineral oil which is compatible with the hard asphalt and which is adapted to plasticize the rubber ingredient, said oil having a pour point below 0° F., an aniline point below 140° F., a Saybolt Universal viscosity @ 100° F. below 300 and a flash point (C. O. C.) above 250° F., and being in amount sufficient to blend with the hard asphalt of the dry component, said dry and liquid components being mixed in such proportions that the initial mixture even when cold has a readily workable semi-liquid consistency suitable for application to a joint and which sets internally to form a resilient and adhesive joint-sealing material.

3. An internal-setting asphaltic filler adapted for cold application to seal expansion joints, comprising a mixture of a dry component comprising comminuted gilsonite dispersed throughout asbestos fibres, and a liquid component comprising a steam refined petroleum asphalt having a melting point (ball and ring) below 150° F., a penetration @ 77° F. (A. S. T. M.) of at least 20 cms., and a ductility @ 77° F. (A. S. T. M.) of at least 60 cms., a synthetic rubber comprising a copolymer of butadiene and styrene, and a mineral oil which is compatible with gilsonite and which is adapted to plasticize said synthetic rubber, said oil having a pour point below 0° F., an aniline point below 140° F., a Saybolt Universal viscosity @ 100° F. below 300 and a flash point (C. O. C.) above 250° F., and being in amount sufficient to blend with the hard asphalt of the dry component, said dry and liquid components being mixed in such proportions that the initial mixture even when cold has a readily workable semi-liquid consistency suitable for application to a joint and which sets internally to form a resilient and adhesive joint-sealing material.

4. An internal-setting asphaltic filler adapted for cold application to seal expansion joints, comprising a mixture of a dry component comprising by weight of from 25% to 60% comminuted gilsonite, from 5% to 25% asbestos fibre, up to 30% asbestos floats, and up to 30% filling materials, and a liquid component comprising by weight from 5% to 35% steam refined petroleum asphalt having a melting point (ball and ring) below 150° F., a penetration @ 77° F. (A. S. T. M.) of at least 20 cms., and a ductility @ 77° F. (A. S. T. M.) of at least 60 cms., from 1% to 15% of a synthetic rubber comprising a copolymer of butadiene and styrene, and from 42% to 79% of a mineral oil which is compatible with the gilsonite and which is adapted to plasticize said synthetic rubber, said oil having a pour point below 0° F., an aniline point below 140° F., a Saybolt Universal viscosity @ 100° F. below 300, and a flash point (C. O. C.) above 250° F., said dry and liquid components being mixed in such proportions that the initial mixture even when cold has a readily workable semi-liquid consistency suitable for application to a joint and which sets internally to form a resilient and adhesive joint-sealing material.

5. An internal-setting asphaltic filler adapted for cold application to seal expansion joints, comprising a mixture of a dry component comprising by weight approximately 49% comminuted gilsonite, 18% asbestos fibre, 20% asbestos floats, and 13% filling materials, and a liquid component comprising by weight approximately 30% steam refined petroleum asphalt having a melting point (ball and ring) below 150° F., a penetration @ 77° F. (A. S. T. M.) of at least 20 cms., and a ductility @ 77° F. (A. S. T. M.) of at least 60 cms., 3% of a synthetic rubber comprising a copolymer of butadiene and styrene, and 67% of a mineral oil which is compatible with the gilsonite and which is adapted to plasticize said synthetic rubber, said oil having a pour point below −20° F., an aniline point below 110° F., a Saybolt Universal viscosity @ 100° F. below 100, and a flash point (C. O. C.) above 300° F., said dry and liquid components being mixed approximately in the proportions of 51 parts of dry component to 39 parts of liquid component by weight.

6. A liquid composition for addition to a dry mixture of a comminuted hard asphalt and fibrous material to form an internal-setting asphaltic filler for cold application to seal expansion joints, consisting essentially of a mixture of a soft, ductile and adhesive asphalt, a rubber which is miscible with hard asphalt, and a mineral oil which is compatible with hard asphalt and adapted to plasticize the rubber, said oil being substantially non-volatile at temperatures below the highest summer temperatures to which it may be subjected and which will pour at winter temperatures, and in amount sufficient to blend with the soft asphalt and rubber to form a liquid.

7. A liquid composition for addition to a dry mixture of a comminuted hard asphalt and fibrous material to form an internal-setting asphaltic filler for cold application to seal expansion joints consisting essentially of a mixture of a substantial proportion of steam refined petroleum asphalt, a relatively small proportion of a rubber which is miscible with hard asphalt, and a substantial proportion of a mineral oil which is compatible with hard asphalt and which is adapted to plasticize the rubber, said oil having a pour point below 0° F., an aniline point below 140° F., a Saybolt Universal viscosity @ 100° F. below 300 and a flash point (C. O. C.) above 250° F.

8. A liquid composition for addition to a dry mixture of comminuted gilsonite and asbestos fibres to form an internal-setting asphaltic filler for cold application to seal expansion joints, consisting essentially of a mixture by weight of from 5% to 35% steam refined petroleum asphalt having a melting point (ball and ring) below 150° F., a penetration @ 77° F. (A. S. T. M.) of at least 20 cms., and a ductility @ 77° F. (A. S. T. M.) of at least 60 cms., from 1% to 15% of a synthetic rubber comprising a copolymer of butadiene and styrene, and from 42% to 79% of a mineral oil which is compatible with gilsonite and adapted to plasticize said synthetic rubber, said oil having a pour point below 0° F., an aniline point below 140° F., a Saybolt Universal viscosity @ 100° F. below 300 and a flash point (C. O. C.) above 250° F.

9. A liquid composition for addition to a dry mixture of comminuted gilsonite and asbestos fibres to form an internal-setting asphaltic filler for cold application to seal expansion joints, consisting essentially of a mixture by weight of approximately 30% steam refined petroleum asphalt having a melting point (ball and ring) below 150° F., a penetration @ 77° F. (A. S. T. M.) of at least 20 cms., and a ductility @ 77° F. (A. S. T. M.) of at least 60 cms., 3% of a synthetic rubber comprising a copolymer of butadiene and styrene, and 67% of a mineral oil which is compatible with gilsonite and adapted to plasticize said synthetic rubber, said oil having a pour point below −20° F., an aniline point below 110° F., a Saybolt Universal viscosity @ 100° F. below 100 and a flash point (C. O. C.) above 300° F.

10. An internal-setting asphaltic filler adapted for cold application to seal expansion joints, comprising a mixture of a dry component comprising comminuted hard asphalt dispersed throughout fibrous material, and a liquid component comprising a soft, ductile and adhesive asphalt, a rubber which is miscible with the hard asphalt, and an oil which is compatible with the hard asphalt and which is adapted to plasticize the rubber ingredient, said oil being substantially non-volatile at temperatures below the highest summer temperature to which it may be subjected in a joint and which will pour at winter temperatures, and being in amount sufficient to blend with the hard asphalt of the dry component, said dry and liquid components being mixed approximately in the proportions of 51 parts of dry component to 39 parts of liquid component by weight.

11. An internal asphaltic filler adapted for cold application to seal expansion joints, comprising a mixture of a dry component comprising a comminuted hard asphalt having a melting point above 250° F. dispersed throughout fibrous material, and a liquid component comprising steam refined petroleum asphalt, a rubber which is miscible with the hard asphalt, and a mineral oil which is compatible with the hard asphalt and which is adapted to plasticize the rubber ingredient, said oil having a pour point below 0° F., an aniline point below 140° F., a Saybolt Universal viscosity @ 100° F. below 300 and a flash point (C. O. C.) above 250° F., and being in amount sufficient to blend with the hard asphalt of the dry component, said dry and liquid components being mixed approximately in the proportions of 51 parts of dry component to 39 parts of liquid component by weight.

12. An internal-setting asphaltic filler adapted for cold application to seal expansion joints, comprising a mixture of a dry component comprising comminuted gilsonite dispersed throughout asbestos fibres, and a liquid component comprising a steam refined petroleum asphalt having a melting point (ball and ring) below 150° F., a penetration @ 77° F. (A. S. T. M.) of at least 20 cms., and a ductility @ 77° F. (A. S. T. M.) of at least 60 cms., a synthetic rubber comprising a copolymer of butadiene and styrene, and a mineral oil which is compatible with gilsonite and which is adapted to plasticize said synthetic rubber, said oil having a pour point below 0° F., an aniline point below 140° F., a Saybolt Universal viscosity @ 100° F. below 300 and a flash point (C. O. C.) above 250° F., and being in amount sufficient to blend with the hard asphalt of the dry component, said dry and liquid components being mixed approximately in the proportions of 51 parts of dry component to 39 parts of liquid component by weight.

13. An internal-setting asphaltic filler adapted for cold application to seal expansion joints, comprising a mixture of a dry component comprising by weight of from 25% to 60% comminuted gilsonite, from 5% to 25% asbestos fibre, up to 30% asbestos floats, and up to 30% filling materials, and a liquid component comprising by weight from 5% to 35% steam refined petroleum asphalt having a melting point (ball and ring) below 150° F., a penetration @ 77° F. (A. S. T. M.) of at least 20 cms., and a ductility @ 77° F. (A. S. T. M.) of at least 60 cms., from 1% to 15% of a synthetic rubber comprising a copolymer of butadiene and styrene, and from 42% to 79% of a mineral oil which is compatible with the gilsonite and which is adapted to plasticize said synthetic rubber, said oil having a pour point below 0° F., an aniline point below 140° F., a Saybolt Universay viscosity @ 100° F. below 300, and a flash point (C. O. C.) above 250° F., said dry and liquid components being mixed approximately in the proportions of 51 parts of dry component to 39 parts of liquid component by weight.

PAUL SUSSENBACH.

REFERENCES CITED

The following references are of record in the file of this patent:

UNITED STATES PATENTS

| Number | Name | Date |
|---|---|---|
| 2,431,386 | Fischer | Nov. 25, 1947 |

OTHER REFERENCES

Article by Fisher in Ind. and Eng. Chem. 31 (pp. 941–945), Aug. 1939.